United States Patent [19]
Nago et al.

[11] Patent Number: 5,403,457
[45] Date of Patent: Apr. 4, 1995

[54] METHOD FOR MAKING SOFT MAGNETIC FILM

[75] Inventors: Kumio Nago, Ikoma; Isamu Aokura, Osaka; Hitoshi Yamanishi, Osaka; Koichi Osano, Osaka; Hiroshi Sakakima, Kyoto; Toshiyuki Suemitsu, Minoh, all of Japan

[73] Assignee: Matsushita Electric Industrial Co., Ltd., Kadoma, Japan

[21] Appl. No.: 111,055

[22] Filed: Aug. 24, 1993

[30] Foreign Application Priority Data

Aug. 24, 1992 [JP] Japan .................. 4-223773

[51] Int. Cl.$^6$ .................. C23C 14/35; G11B 5/127
[52] U.S. Cl. .................. 204/192.2; 204/298.16; 29/603; 360/126
[58] Field of Search .................. 204/192.2, 298.16; 29/603; 360/126

[56] References Cited

U.S. PATENT DOCUMENTS

| | | | |
|---|---|---|---|
| 4,865,709 | 9/1989 | Nakagawa et al. | 204/192.12 |
| 5,026,470 | 6/1991 | Bonyhard et al. | 204/298.16 |
| 5,045,166 | 9/1991 | Bobbio | 204/192.32 |
| 5,176,806 | 1/1993 | Hasegawa | 204/192.11 |

FOREIGN PATENT DOCUMENTS

| | | | |
|---|---|---|---|
| 3603726 | 8/1987 | Germany | 204/298.16 |
| 59-16322 | 1/1984 | Japan . | |
| 59-172225 | 9/1984 | Japan . | |
| 62-195109 | 8/1987 | Japan . | |
| 64-65262 | 3/1989 | Japan | 204/298.16 |
| 3-87365 | 4/1991 | Japan | 204/298.16 |
| 4-137715 | 5/1992 | Japan . | |

OTHER PUBLICATIONS

J. Appl. Phys. 65(3), Feb. 1, 1989, Senda et al., "Magnetic Properties of Fe/SiO$_2$ Multilayer Film," pp. 1238–1242.

IEEE Translation Journal on Magnetics, vol. 6, No. 1, Jan. 1991 "Effects of Addition of Zr and Ti on Sputtered Fe-N Films," Terunuma et al., pp. 23–28.

Primary Examiner—Aaron Weisstuch
Attorney, Agent, or Firm—Willian Brinks Hofer Gilson & Lione

[57] ABSTRACT

The method of the invention provides a soft magnetic film having a high saturation magnetic flux density and an anisotropy of high magnetic permeability suitable for use in various types of magnetic heads at a high production yield by use of a sputtering apparatus provided with a sputtering electrode, which has permanent magnets arranged above a target 1 mainly of Fe or Co in such a way that lines of magnetic force 3 generated by said permanent magnets are in parallel to the surface of said target 1 and to the center line of said target 1 and have a magnetic strength pattern symmetric with respect to said center line while the lines of magnetic force to the right of said center line are of a reverse direction to those to the left of said center line.

11 Claims, 14 Drawing Sheets 1 target
2 permanent magnet
3 lines of magnetic force
4 substrate
5 backing plate
6 electrode body 1 target
2 permanent magnet
3 lines of magnetic force
4 substrate
5 backing plate
6 electrode body

METHOD FOR MAKING SOFT MAGNETIC FILM

BACKGROUND OF THE INVENTION

1. Field of the Invention

The present invention relates to a method for making a soft magnetic film for use in a magnetic head of a magnetic recording and reproducing apparatus such as a video cassette recorder (VCR) and an audio recording and reproducing apparatus.

2. Description of the Prior Art

In response to the requirement of high recording density in recent magnetic recording technology, much attention has been paid to the development of a magnetic head having a superior performance. In order to achieve a high recording density, it has been necessary to make the track width and the gap length of the magnetic head as narrow as possible and to manufacture a magnetic head from a core material of a soft magnetic film having a high magnetic flux density and a high magnetic permeability.

In order to satisfy the requirement mentioned above, various types of magnetic heads have been developed: One example as shown in FIGS. 9–10 is a magnetic head of a laminated-type head having a ring shape in which the core material is made of layers of a soft magnetic film 10 and an electric insulating film 11 laminated alternately and sandwiched between a pair of non-magnetic substrates 12. The core material forms a magnetic path. 13 denotes a glass material and 14 a magnetic gap.

Another example as shown in FIG. 11 is a magnetic head (referred to as an MIG head) in which the majority of the magnetic path is composed of ferrite material 15 and at the vicinity of the magnetic gap 16 easily saturated magnetically there is provided a soft magnetic film 17. 18 denotes a glass material and 19 an insulating film.

In the magnetic heads, the performance thereof relates closely to the material characteristics of the core material. In order to achieve a high recording density, it is necessary for the core material to have a high saturation magnetic flux density (related to mainly to the recording characteristics) and a high magnetic permeability (related mainly to the reproduction characteristics).

In connection with the requirement mentioned above, the core material for the above laminated-type head must be formed from a material having a high isotropic permeability. A core material practically used at present is Sendust film (Fe—Al—Si alloy) or a cobalt based amorphous alloy film. On the other hand, the core material for the MIG head is preferably made of a soft magnetic film having a high magnetic permeability with a uniaxial anisotropy in a plane. The core material practically used at present is Sendust film (Fe—Al—Si alloy) or a cobalt based amorphous alloy film. However, the Sendust film (Fe—Al—Si alloy) or cobalt based amorphous alloy film has a saturation magnetic flux density as low as about 1 T. Although effort has been directed to achievement of high recording density by using a recording medium having a high coercive force, the conventional core material has a limitation in the saturation magnetic flux density.

In view of the above situation, research and development have been directed to a soft magnetic film having a high saturation magnetic flux density and a high magnetic permeability. The core material under research is a film composed of (Fe,Co)—M—(N,C,B) alloy system (wherein M is at least one metal selected from the group consisting of Zr, Hf, Ti, Nb, and Ta), Fe—Co—B alloy alloy or Fe—N alloy alloy.

On the other hand, research on film formation methods has been carried out by using an electron beam evaporation method or sputtering method in connection with a soft magnetic material such as the Sendust alloy film or Permalloy film. Specifically, the magnetron sputtering method makes it possible to carry out the film formation at a high speed by improving on the usual disadvantage of the sputtering method which is a film formation rate lower by one order than the electron beam evaporation method. Further, recent progress in the film formation technology has produced new types of sputtering apparatus such as a carrousel type and an in-line type. The sputtering apparatus of the carrousel type is provided with a magnetron sputtering electrode in the shape of a rectangular flat plate and carries out the film formation while rotating a cylinder type substrate holder. The sputtering apparatus of in-line type is of a large scale and carries out the film formation while moving the substrate in parallel to a target. These sputtering apparatuses can execute the film formation at a high speed which is characteristic to the magnetron sputtering and obtain a uniform film thickness over a large area. As a result, a mass production of the soft magnetic film can be achieved by these sputtering apparatuses.

FIG. 18 is a schematic illustration of a conventional magnetron sputtering electrode provided with a target of a rectangular flat plate. A target 1 is adhered to a backing plate 5 with a soldering material such as indium and attached to an electrode body 6 thorough an O-ring vacuum seal. The target 1 has a magnetic circuit for the magnetron discharge formed at the back side thereof. The magnetic circuit forms a closed loop of lines of magnetic force 7 and at least a part of the lines of magnetic force 7 are arranged in parallel to each other at the surface of the target 1. As a result, there is formed, at the surface of the target 1, a magnetic field of a toroidal type having a closed tunnel shape. When the sputtering electrode attached to the rectangular flat plate target 1 is applied with a negative voltage through a DC or AC power source, the magnetron discharge is generated in the vicinity of the magnetic field of toroidal type having a closed tunnel shape where the electric field and the magnetic field cross each other. Then the target 1 starts sputtering to form a soft magnetic film on a substrate 4.

A core material known to have a high saturation magnetic flux density and a high magnetic permeability is a film composed of the (Fe,Co)—M—(N,C,B) alloy system (M is at least one metal selected from the group consisting of Zr, Hf, Ti, Nb, and Ta), Fe—Co—B alloy system or Fe—N alloy system and is made by a conventional magnetron sputtering method using a rectangular flat plate target or by a reactive sputtering using nitrogen gas for formation of a nitride film. In this case, it is necessary to sputter a thick target composed of a core material having a high saturation magnetic flux density such as (Fe,Co)—M—(N,C,B) alloy system (where M is at least one metal selected from the group consisting of Zr, Hf, Ti, Nb, and Ta), Fe—Co—B alloy system or Fe—N alloy system. The thick target prevents the magnetic flux from passing over the target surface. As a result, the magnetron discharge does not occur and sputtering is prevented.

Use of a thinner target permits the magnetron discharge and makes it possible to perform the sputtering. However, the conventional magnetron sputtering method causes the target to be eroded heterogeneously because the magnetic field produces an area to be sputtered (referred to as an erosion area hereinafter and shown by reference numeral 9 of FIG. 18) and an area having the sputtered particles re-adhered thereto. This causes the erosion area to change with the progress of the sputtering. As a result, the thickness distribution of the sputtered film changes, which causes the magnetic properties of the resultant film to change with the change in the thickness distribution. Therefore, there is a problem that the conventional magnetron sputtering method has a poorer efficiency of target utilization when the target is made thinner. This results in a problem that it is difficult to manufacture the magnetic film in a large scale.

On the other hand, as described above, the core material for the multilayer type of head requires a material having a high permeability and an isotropy in a plane. The core material for the MIG head mentioned above and a head of a main-pole driven magnetic head require a soft magnetic film having a high magnetic permeability to induce uniaxial anisotropy in a plane. Therefore, it is important to control the magnetic anisotropy.

SUMMARY OF THE INVENTION

The object of the present invention is therefore to provide a method for making a soft magnetic film having a high magnetic permeability and a high saturation magnetic flux density together with a desirable magnetic anisotropy, which is suitable for mass-production.

According to one aspect of the present invention, there is provided a method for making a soft magnetic film according to the present invention which uses a sputtering apparatus provided with a sputtering electrode which has permanent magnets arranged above a rectangular flat plate target in such a way that lines of magnetic force generated by said permanent magnets are in parallel to the surface of said rectangular flat plate target and the magnetic strength distribution on both sides of the center line of said target is symmetrical, and the lines of magnetic force to the right of said center line are of a reverse direction to those for the said center line.

The method according to the present invention is suitable for making a ferromagnetic films such as a soft magnetic film which include, as a main ingredient, Fe or Co, especially Fe—M—N system films which include as a main ingredient Fe, 5 to 20 atomic % of N, and 5 to 15 atomic % of a metal M (which is at least one element selected from the group consisting of Ta, Zr, Hf, Nb, and Ti).

In carrying out the method according to the present invention, in many cases a small negative bias voltage is applied to a substrate to be provided with such a soft magnetic film while in some cases a non-bias voltage is applied. This method can provide a soft magnetic film having a high magnetic permeability and a high saturation magnetic flux density in a large scale in response to the requirement for high efficiency magnetic heads.

According to another aspect of the present invention, there is provided a method for making a multilayer soft magnetic film having plural soft magnetic films laminated to each other through an electrically insulating film. In the method, each soft magnetic film is formed with a different bias power by using the sputtering apparatus according to the present invention. The resultant soft magnetic film has a high magnetic permeability distributed uniformly in a large area and is characterized by a superior mass production of the soft magnetic film core materials of the multilayer type of head.

The soft magnetic films known as the Fe—M—N system films include, as a main ingredient, Fe, 5 to 20 atomic % of N, and 5 to 15 atomic % of a metal M (which is at least one element selected from the group consisting of Ta, Zr, Hf, Nb, and Ti) and are formed on a substrate by means of the magnetron sputtering method with different bias powers (including zero). These soft magnetic films having a specified thickness are laminated to each other through an electrically insulating film having a specified thickness. The resultant soft magnetic film has a high magnetic permeability distributed uniformly in a large area and is characterized by a superior mass production of the soft magnetic film core materials of the multilayer type of heads operable at high frequency range.

The soft magnetic films of the Fe—M—N system comprise a mixture of fine crystals of $\alpha$—Fe and fine metal nitride particles, also referred to herein as "fine crystals of metal nitride" or "fine particles of a nitride of a metal". The fine crystals of $\alpha$—Fe include as a solid solution at least one element or compound selected from the group consisting of Ta, Zr, Hf, Nb, and Ti, N (nitrogen), and a metal (M) nitride which expand the lattice of $\alpha$—Fe and have an average grain size less than 15 nm. The films also include fine crystals of metal nitride which have a grain size less than 5 nm and provide better soft magnetic characteristics.

According to the method for making a soft magnetic film, there is manufactured a soft magnetic film having a high saturation magnetic flux density and a high magnetic permeability in a large scale, since the magnetron sputtering comprises a step of forming a soft magnetic film on a substrate by using a sputtering apparatus provided with a sputtering electrode which has permanent magnets arranged above a rectangular flat plate target in such a way that the lines of magnetic force generated by said permanent magnets are in parallel to the surface of said target and the magnetic strength distribution on opposite sides of the center line of said target are symmetric with respect to said center line while the lines of magnetic force to the right side of said center line are of a reverse direction to those to the left side of said center line.

According to the preferred embodiment, by applying a negative bias power to the substrate during the soft magnetic film formation in the above method, the resultant soft magnetic film formed on the substrate shows magnetic permeability having an anisotropy oriented in one direction at a wide area which is suitable for use in a core material of MIG and main-pole driven magnetic heads and is manufactured effectively in a large scale. Especially, a power density of 3700 W/m² or less provides a higher mass-production of soft magnetic films suitable for use in the core material of MIG heads etc.

According to another method for making multilayer soft magnetic films which are separated from each other through an electrically insulating film, by means of different bias power (including zero), the resultant soft magnetic film formed on the substrate shows an isotropic high permeability distributed uniformly over a wide area and is manufactured effectively in a large scale.

In the soft magnetic film composed of, as a main ingredient, Fe, 5 to 20 atomic % of N, and 5 to 15 atomic % of metal M (which is at least one element selected from the group consisting of Ta, Zr, Hf, Nb, and Ti), said soft magnetic film comprises a mixture of fine crystals of α—Fe and fine crystals of metal nitride, in which the α—Fe crystals include as a solid solution at least one element or compound selected from the group consisting of Ta, Zr, Hf, Nb, Ti, N (nitrogen), and a metal (M) nitride and expand the lattice of α—Fe to an average grain size less than 15 nm while the fine crystals of metal nitride have a grain size less than 5 nm, so that the resultant soft magnetic film has better soft magnetic characteristics.

Heads comprising the soft magnetic film formed by the present invention as at least a part of the magnetic circuit realize a high mass-production and a superior recording reproduction characteristics against a high coercive force media.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

EXAMPLE 1

Figure 1:
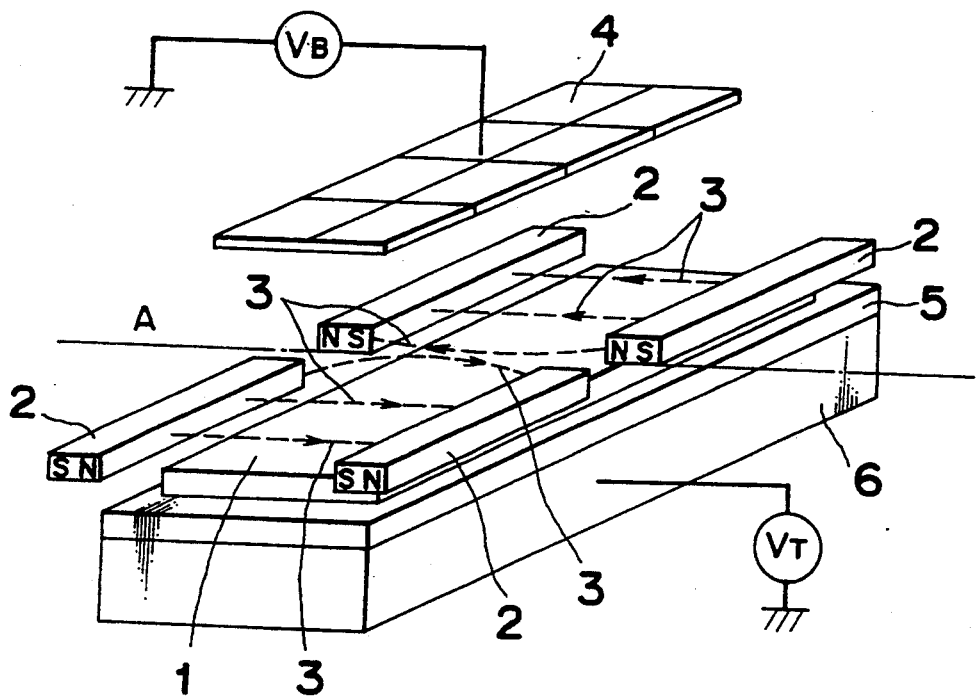
FIG. 1 is a schematic view of the sputtering apparatus according to the embodiment of the present invention.
Figure 18:
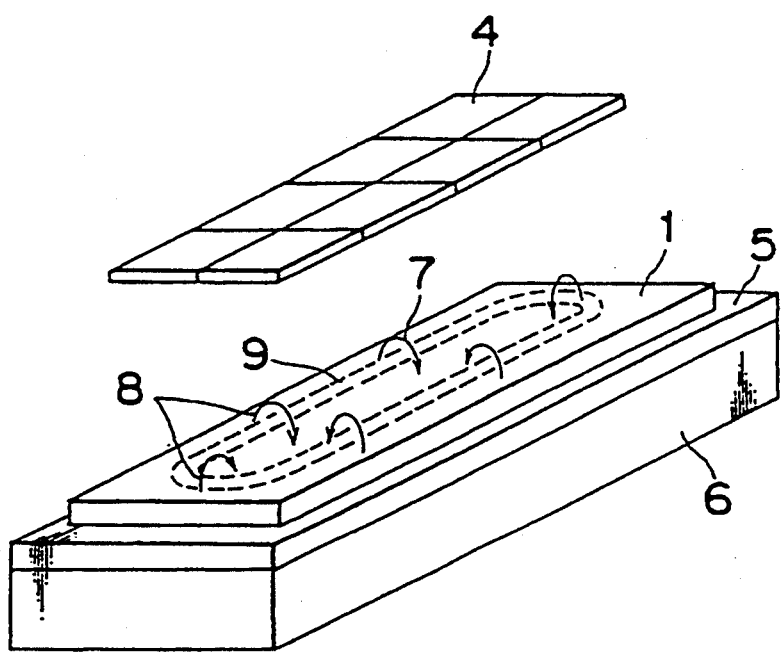
FIG. 18 is a schematic view of the magnetron sputtering electrode according to the prior art.

FIG. 1 is a perspective view showing the sputtering electrode and the position of the substrate in the sputtering apparatus according to the first embodiment of the present invention. Elements in FIG. 1 having the same reference numeral as the conventional elements shown in FIG. 18 are omitted from the description.

A target 1 of a rectangular shape has permanent magnets 2 arranged at the side thereof to form a magnetic circuit for generation of a magnetic field. Each of the permanent magnets 2 comprises a plurality of small magnets of the purpose of changing the strength of the magnetic field. Lines of magnetic force 3 parallel to the surface of the target of rectangular shape are in parallel to the center line A of the target 1 and are arranged symmetrically on opposite sides of the center line A with respect to the intensity of the lines of magnetic force. Further, the lines of magnetic force to the right of the center line A are in a reverse direction to the lines of magnetic force to the left of the center line A. A substrate 4 is placed above the target 1 in parallel to the surface of the target 1 and is applied with a bias power.

When the permanent magnets are arranged in such a way that all the lines of magnetic force parallel to the surface of the target are in one direction, the spiral motion of electrons due to the magnetic field and the electric field is limited to one direction. Accordingly, the plasma density shows a change from a high level to a low level in a direction crossing the lines of the magnetic force and parallel to the surface of the target. As a result, the film thickness distribution shows a large variation.

A soft magnetic film of the Fe—Ta—N system is prepared by reactive sputtering using Ar gas containing N$_2$ gas. The apparatus used is shown in FIG. 1. The target is a Fe—Ta target of a rectangular shape of length 127 mm and width 381 mm. The substrate holder has an effective area of $2.7 \times 10^{-2} m^2$ (length 100 mm and width 270 mm) and is applied with a RF bias power of 0 to 150 W (in terms of the power density, 0 to 5,556 W/m$^2$). A soft magnetic film of Fe—Ta—N system having a thickness of 2.5 μm is formed on a ceramic substrate which is water cooled and has a thermal expansion coefficient of $115 \times 10^{-7}/°C$.

Figure 2:
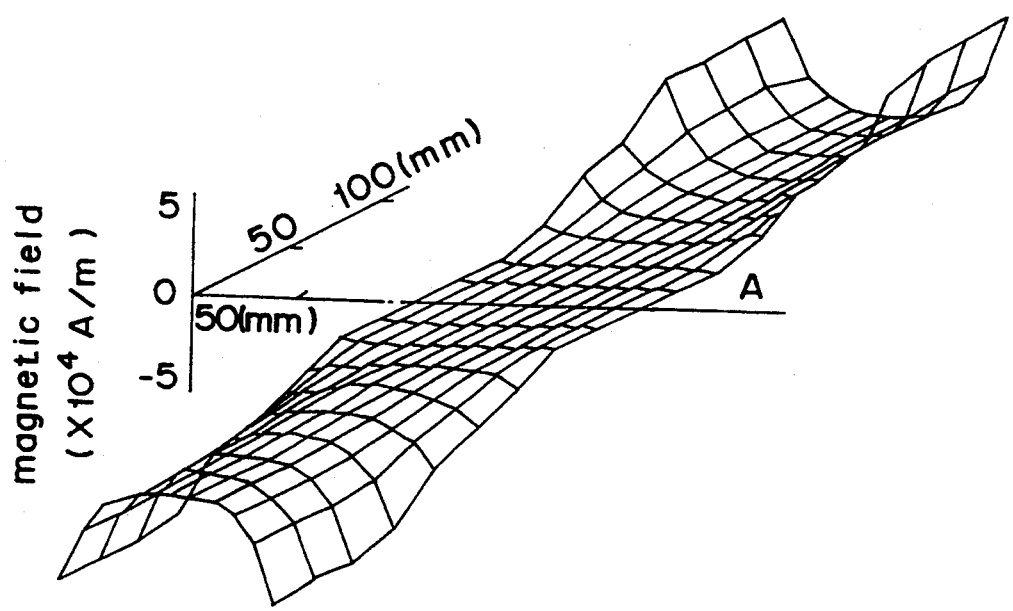
FIG. 2 is a schematic view of the magnetic field distribution on the target.
Figure 3:
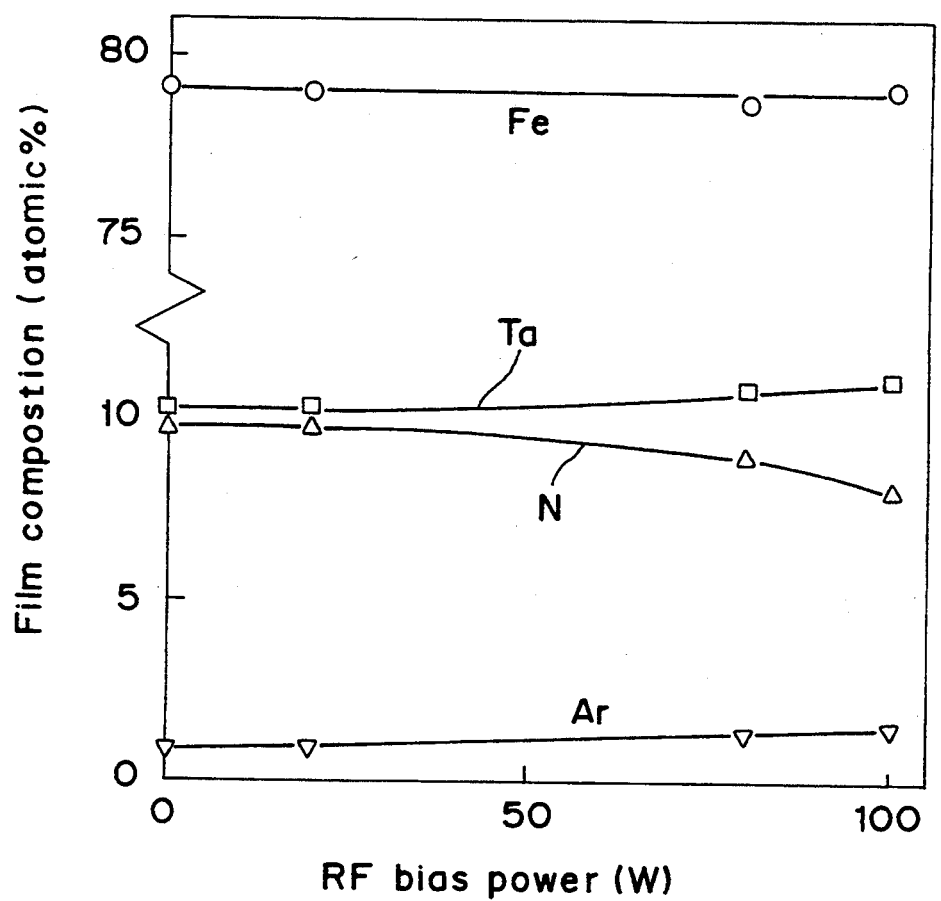
FIG. 3 is a graph showing the relation between the composition of the soft magnetic film and the radio frequency (RF) bias power applied to the substrate holder.

FIG. 2 is a schematic view of the magnetic field distribution in a direction parallel to the surface of the target. The center line A shown in FIG. 2 is the same line as that of FIG. 1. The magnetic field is referred to as positive when the line of magnetic force runs from the N pole of the permanent magnet at the right side of FIG. 1 to the S pole of the permanent magnet at the left side. The magnetic field is referred to as negative when the line of magnetic force runs from the N pole of the permanent magnet at the left side of FIG. 1 to the S pole of the permanent magnet at the right side. The composition of the magnetic film of Fe—Ta—N system is analyzed by means of RBS (Rutherford back scattering method). FIG. 3 is a graph showing the relation between the negative bias power applied to the substrate holder and the film composition. It is clear from FIG. 3 that the Fe content of the magnetic film does not change for bias power strengths of 0 to 100 W. The Fe content is a constant value of 79 atomic %.

The contents of Ta and N in the soft magnetic film do not change with changes of the bias power ranging from 0 to 20 W and show a constant value of about 10 atomic %. At a bias power of 100 W, large changes are not shown, that is, the content of Ta increases only by 1 atomic % and the content of N decreases only by 2 atomic %. The magnetic film includes 0.7 to 1.5 atomic % of Ar. It is unavoidable that the film includes several atomic % of Ar or oxygen.

Figure 4:
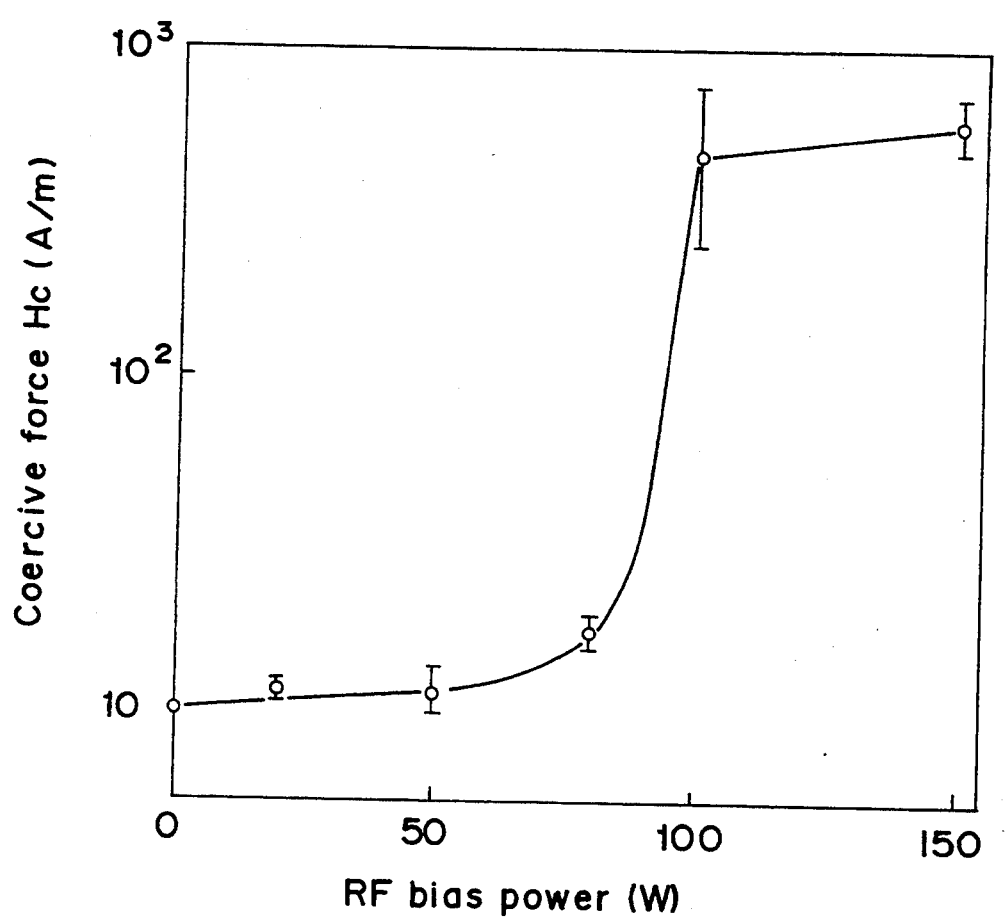
FIG. 4 is a graph showing the relation between the coercive force of the soft magnetic film and the RF bias power applied to the substrate holder.

The resultant film is heat-treated in vacuum for one hour at 550° C. without presence of a magnetic field. FIG. 4 is a graph showing the relation between the coercive force of the resultant film and the radio frequency bias power applied to the substrate holder. It is clear from FIG. 4 that bias power from 0 to 80 W produces a soft magnetic film of a superior soft magnetic characteristic represented by a coercive force Hc less than 20 A/m. On the other hand, bias power higher than 100 W results in a rapid increase in the coercive force (about 500 A/m) and in an inferior soft magnetic characteristic. The variation in the soft magnetic characteristic results from the change in the structure of the magnetic film as shown in FIG. 5.

Figure 5:
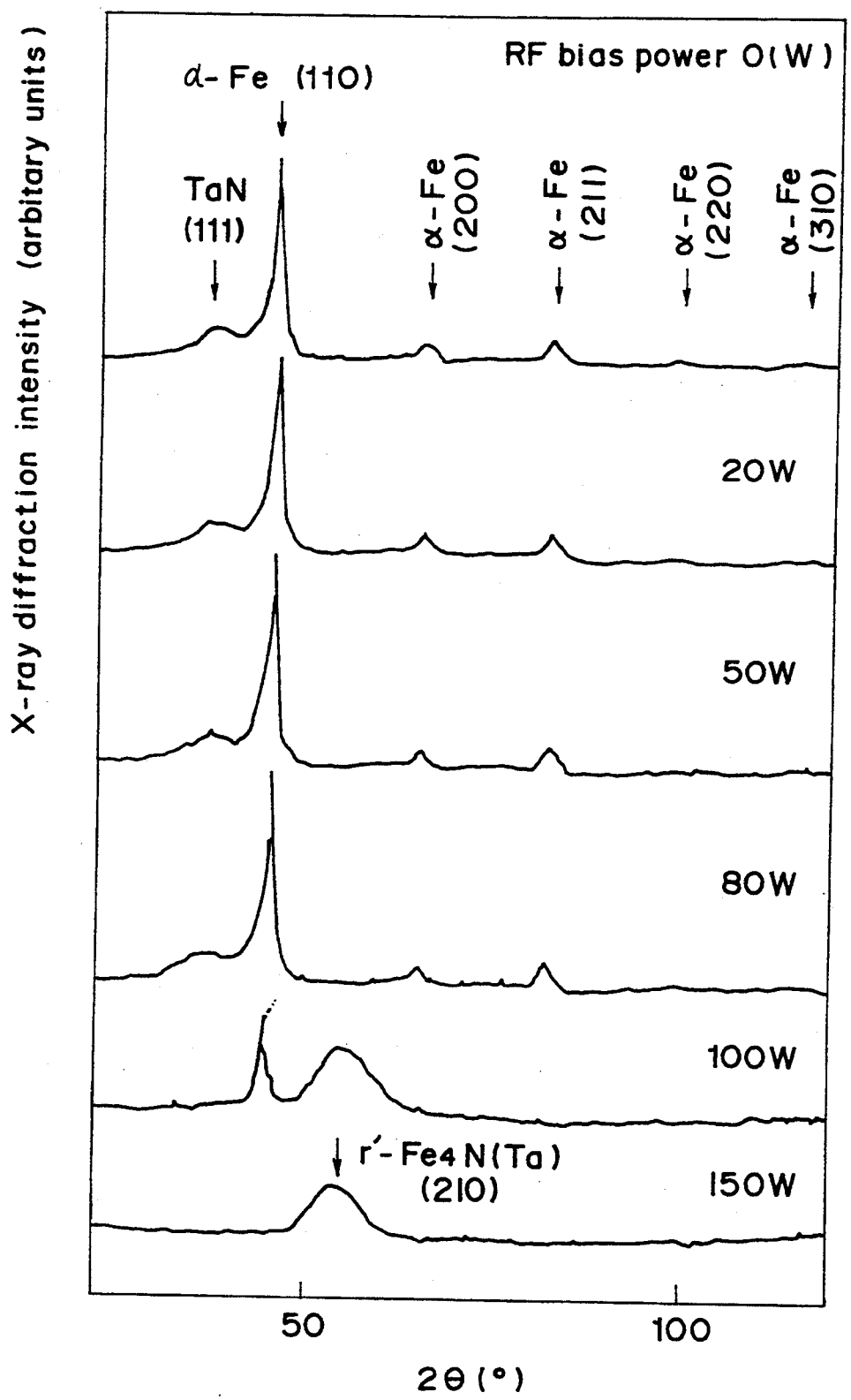
FIG. 5 is a graph showing the x-ray diffraction pattern of the soft magnetic film.

FIG. 5 shows the bias power dependence of the x-ray diffraction patterns of the film in the range of bias power from 0 to 80 W. It is clear from FIG. 5 that the film having a superior soft magnetic characteristic is of a fine structure which comprises a mixture of $\alpha$—Fe having expanded lattices and tantalum nitride. An electron microscopic observation indicates that the $\alpha$—Fe crystals are of an average grain size less than 15 nm and the tantalum nitride fine particles are of an average grain size less than 5 nm. The film showing a superior soft magnetic characteristic has a saturation magnetic flux density Bs of 1.5 to 1.6 T and a saturation magnetostriction $\lambda$s of an absolute value less than $10^{-6}$.

EXAMPLE 2

A soft magnetic film of the Fe—Ta—N system is formed in a similar way to that of Example 1 with a radio frequency bias power ranging from 0 to 80 W. The soft magnetic films of the Fe—Ta—N system had a film thickness of 2.5 $\mu$m and their magnetic permeability was measured. The soft magnetic films according to example 2 showed coercive force, saturation magnetic flux density, saturation magnetostriction, film composition, and film structure similar to those of example 1.

Figure 6:
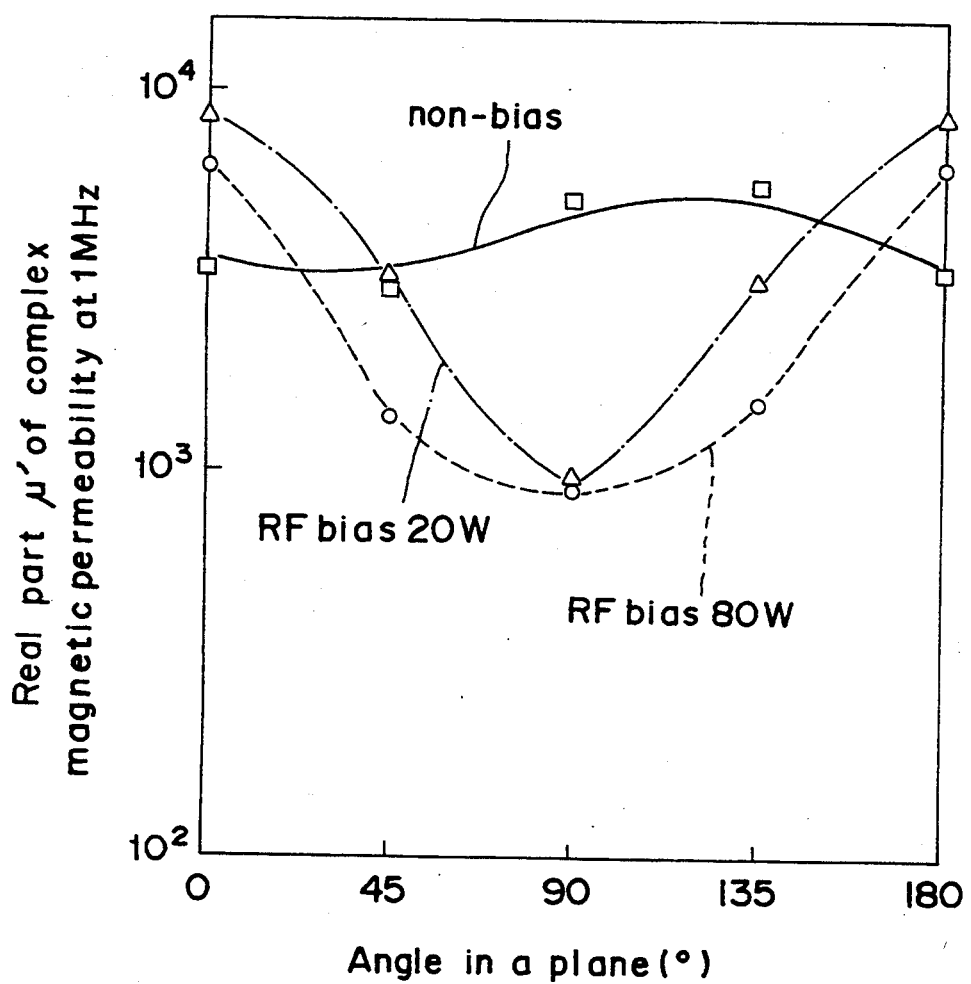
FIG. 6 is a graph showing the variation of the magnetic permeability with variation in the position in the film plane of the soft magnetic film.
Figure 7:
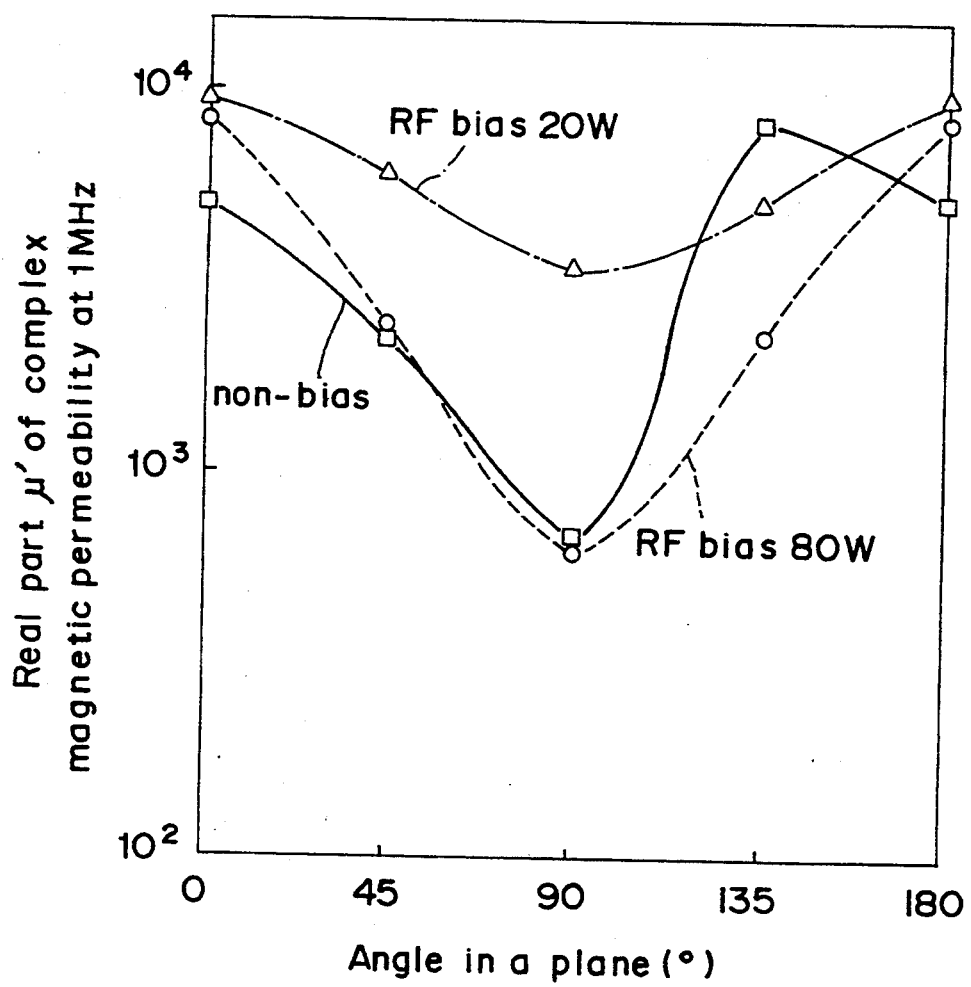
FIG. 7 is a graph showing the variation of the magnetic permeability with variation in the position in the film plane of the soft magnetic film.

Since the soft magnetic film is formed by an oblique sputtering particle projection, the soft magnetic film shows anisotropy of the magnetic permeability of the film plane which varies with the position of the substrate. FIGS. 6 and 7 are graphs showing the variation in the real part $\mu'$ of the complex magnetic permeability at 1 MHz with variation in the position of the substrate.

The film formation is carried out by applying the radio frequency bias power of 0, 20 W, and 80 W. The film formed at the substrate position shown in FIG. 6 shows isotropy of the high magnetic permeability at non-bias power, and shows uniaxial anisotropy of high permeability at the bias power of 20 W and 80 W. On the other hand, the film formed at the substrate position shown in FIG. 7 shows an anisotropy of high magnetic permeability at non-bias power, relatively isotropic permeability at the bias power of 20 W and uniaxial anisotropy of magnetic permeability at the bias power of 80 W. The soft magnetic film formed at the bias of 80 W shows that the high magnetic permeability of uniaxial anisotropy has a high degree of orientation at one direction and is very suitable for use in a core material for the MIG head.

However, in the case of a soft magnetic film of a multilayer type comprising alternately laminated layers with an intermediate electric insulating layer, one of which is a soft magnetic layer of Fe—Ta—N formed under the condition of non-bias power and the other is a soft magnetic layer of Fe—Ta—N formed under the condition of RF 20 W bias power, all the resultant soft magnetic films are isotropic at the substrate positions shown in FIG. 6 and FIG. 7, whereby there is attained an enlargement of the isotropic film forming area within the substrate holder. The reason is that the resultant magnetic permeability is not dependent on the arithmetical mean of the two laminated layers and tends to be dependent on the higher magnetic permeability, so that isotropic film formation is realized.

EXAMPLE 3

Soft magnetic films of the Fe—Ta—N system are formed at bias powers of zero and 20 W and are alternately laminated with an intermediate SiO$_2$ insulating film. The SiO$_2$ insulating film at each layer is 0.15 $\mu$m thick and the soft magnetic film is 2.5 $\mu$m thick. The soft magnetic film of multilayer type has a total thickness of 15 $\mu$m.

For comparison, soft magnetic films of multilayer type comprising the Fe—Ta—N system are formed by two methods; one method is to alternately laminate a soft magnetic film (thickness 2.5 $\mu$m) obtained at non-bias power and the SiO$_2$ insulating film (thickness 0.15 $\mu$m) into a total thickness of 15 $\mu$m; and another method is to alternately laminate a soft magnetic film (thickness 2.5 $\mu$m) obtained at 20 W negative power and the SiO$_2$ insulating film (thickness 0.15 $\mu$m) into a total thickness of 15 $\mu$m. The Fe—Ta—N magnetic film at each layer comprises Ta 10.5 atomic %, N 10 atomic %, and Fe 79.5 atomic %, similar to those of Examples 1 and 2. The Fe—Ta—N soft magnetic film at each layer exhibits coercive force, saturation magnetic flux density, saturation magnetostriction, film composition, and the film structure similar to those of examples 1 and 2.

Figure 8:
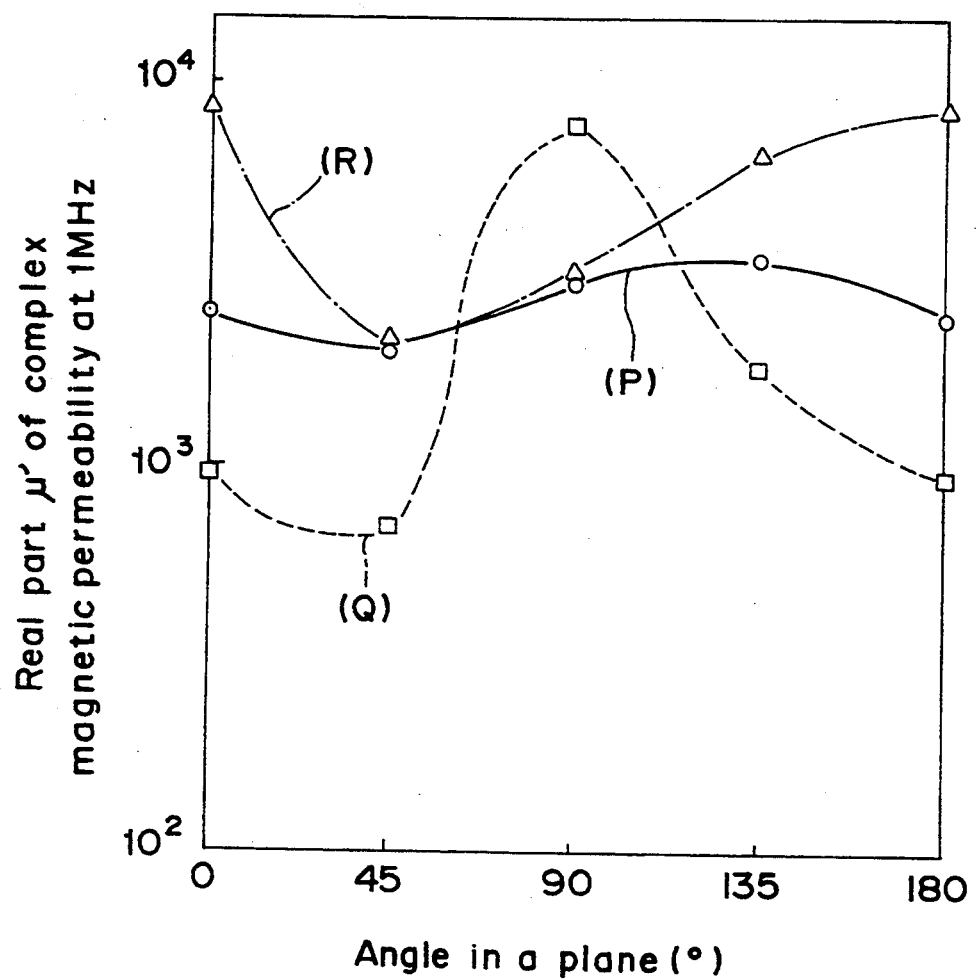
FIG. 8 is a graph showing a variation of the magnetic permeability with variation in the position in the film plane of the soft magnetic film of a multilayer type.

FIG. 8 is a graph showing the variation in the real part $\mu'$ of the complex magnetic permeability of the three soft magnetic films at 1 MHz with a variation in the position of the substrate. Reference character (P) denotes a multilayer type of soft magnetic film obtained by alternately laminating soft magnetic films of Fe—Ta—N system formed at RF bias powers of zero and 20 W to each other through a SiO$_2$ insulating film. Reference character (Q) denotes a multilayer type of soft magnetic film obtained by alternately laminating soft magnetic films of the Fe—Ta—N system formed at zero RF bias power to each other through a SiO$_2$ insulating film. Reference character (R) denotes a multilayer type of soft magnetic film obtained by alternately laminating soft magnetic films of the Fe—Ta—N system formed at RF bias powers of 20 W to each other through a SiO$_2$ insulating film.

As shown in FIG. 8, anisotropy of the magnetic permeability is observed with the multilayer type of soft magnetic film obtained by alternately laminating soft magnetic films of the Fe—Ta—N system formed at zero RF bias power to each other through a SiO$_2$ insulating film (Q) and the multilayer type of soft magnetic film obtained by alternately laminating soft magnetic films of the Fe—Ta—N system formed at negative bias power of 20 W to each other through a SiO$_2$ insulating film (R). On the other hand, isotropy of the high magnetic permeability is observed with the multilayer type of soft magnetic film obtained by alternately laminating soft magnetic films of the Fe—Ta—N system formed at RF bias powers of zero and 20 W to each other through a SiO$_2$ insulating film (P).

This effect is confirmed with all positions of the substrate. The isotropic high magnetic permeability is observed over a large area. Therefore, it is possible to manufacture the core material for use in the laminated-type head.

This example is directed to the multilayer type of soft magnetic film obtained by alternately laminating soft magnetic films of the Fe—Ta—N system formed at non-bias and at RF bias power of 20 W to each other through a SiO$_2$ insulating film. The applied bias voltage may be a DC voltage. It is found that the same effect as above can be obtained with the multilayer type of soft magnetic film in which the two soft magnetic films of Fe—Ta—N system adjacent to each other through a SiO$_2$ insulating film are applied with bias powers different from each other (including zero).

EXAMPLE 4

Figure 9:
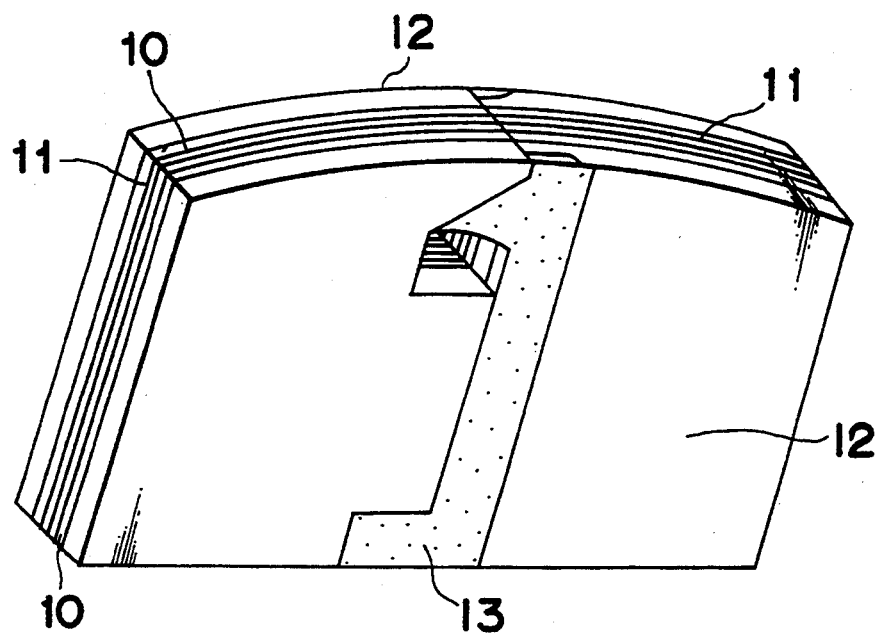
FIG. 9 is a schematic view of the laminated-type head according to the present invention.
Figure 10:
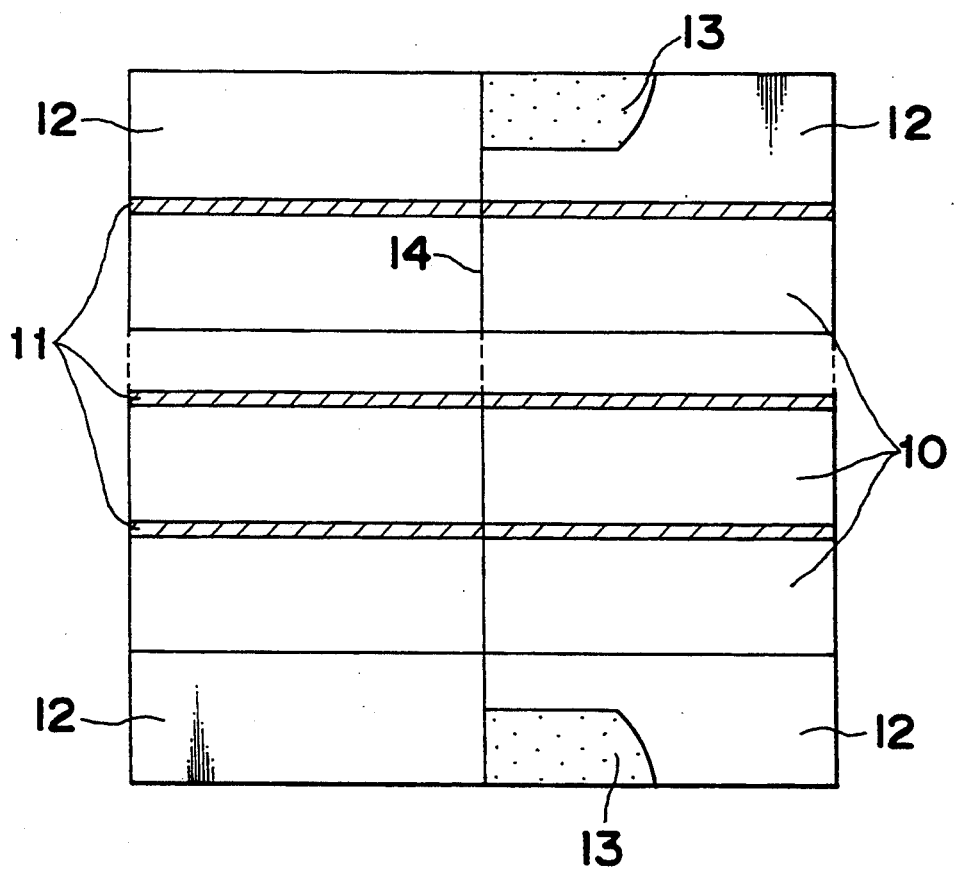
FIG. 10 is an enlarged plane view of the contacting surface of the head shown in FIG. 9.

A laminated- type head as shown in FIG. 9 is manufactured by heat-treating in the absence of a magnetic field a magnetic head made of an isotropic soft magnetic multilayer film having high magnetic permeability, which is prepared by alternately laminating a soft magnetic film formed at non-bias power and a soft magnetic film formed at 20 W RF bias power through a SiO$_2$ insulating film. As seen from FIG. 10 showing an enlargement of the head, the head is provided with a track width of 15 μm, a gap length of 0.2 μm, a gap depth of 20 μm and the number of turns of the coil is 18. Output of the head is measured as the self-recording reproduction characteristics at a relative speed of 4.5 m/s in a drum tester by use of MP tape having a coercive force of 120 kA/m. As compared with the laminated-type head made of the multilayer film (Q), C/N is improved by more than about 5 dB in a high frequency field of 3 MHz to 10 MHz.

It is confirmed that the above isotropic forming effect is shown at every site or position of the substrate, so that mass-production with larger film forming areas is possible.

This example is directed to the multilayer type of soft magnetic film obtained by alternately laminating to each other soft magnetic films of the Fe—Ta—N system formed at non-bias and at RF bias power of 20 W through a SiO$_2$ insulating film. The applied bias voltage may be DC bias voltage. It is found that the same effect as above can be obtained with the multilayer type of soft magnetic film in which the two soft magnetic films of the Fe—Ta—N system adjacent to each other through a SiO$_2$ insulating film are applied with bias powers different from each other (including zero).

EXAMPLE 5

Figure 11:
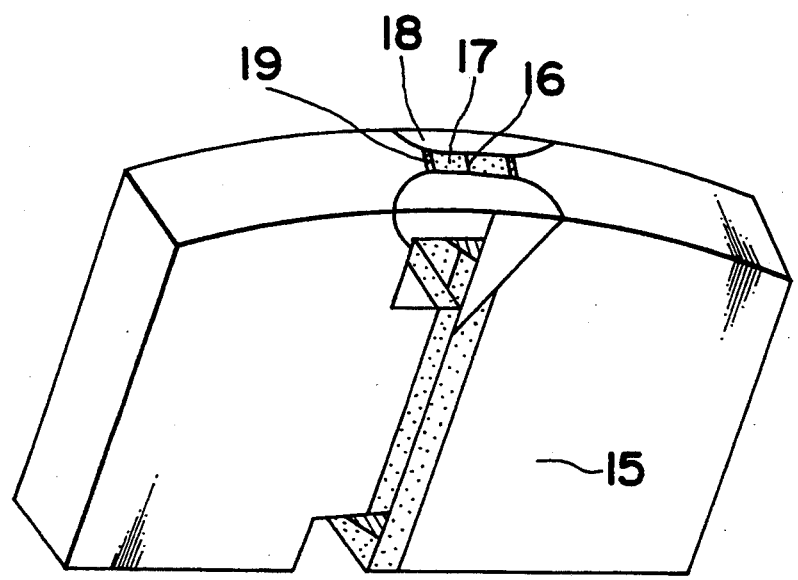
FIG. 11 is a schematic view of the MIG type head according to the present invention.
Figure 12:
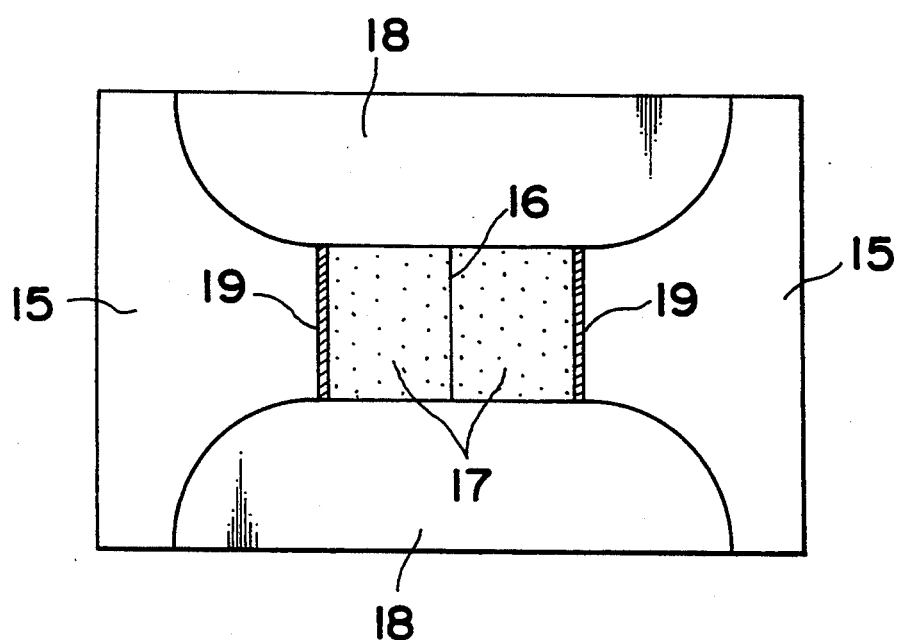
FIG. 12 is an enlarged plane view of the contacting surface of the head shown in FIG. 11.

An MIG type head as shown in FIG. 11 is manufactured by heat-treating in the absence of a magnetic field a magnetic head made of a soft magnetic film of the Fe—Ta—N system having a thickness of about 4 μm which is prepared by forming a soft magnetic film formed at 80 W RF bias power on a substrate of Mn—Zn ferrite covered with a SiO$_2$ insulating film having a thickness of about 10 nm. All the resultant films formed at 80 W RF bias show a uniaxial anisotropy and are arranged in the same direction. As seen from FIG. 12 showing an enlargement of the head, the head is provided with a track width of 15 μm, a gap length of 0.2 μm, a gap depth of 20 μm, and the number of the turns of the coil is 20. Output of the head is measured as the self-recording reproduction characteristics at a relative speed of 4.5 m/s in a drum tester by use of MP tape having a coercive force of 120 kA/m. As compared with the MIG type head made of the film of Fe—Ta—N formed under non-bias conditions, in which different positions of the ferrite substrates cause the resultant films to give a variety of head outputs, all the films formed at 80 W RF bias power show a uniaxial magnetic permeability arranged in the same direction, so that mass-production of MIG heads according to the present invention having a stable head output is possible.

EXAMPLE 6

Figure 13:
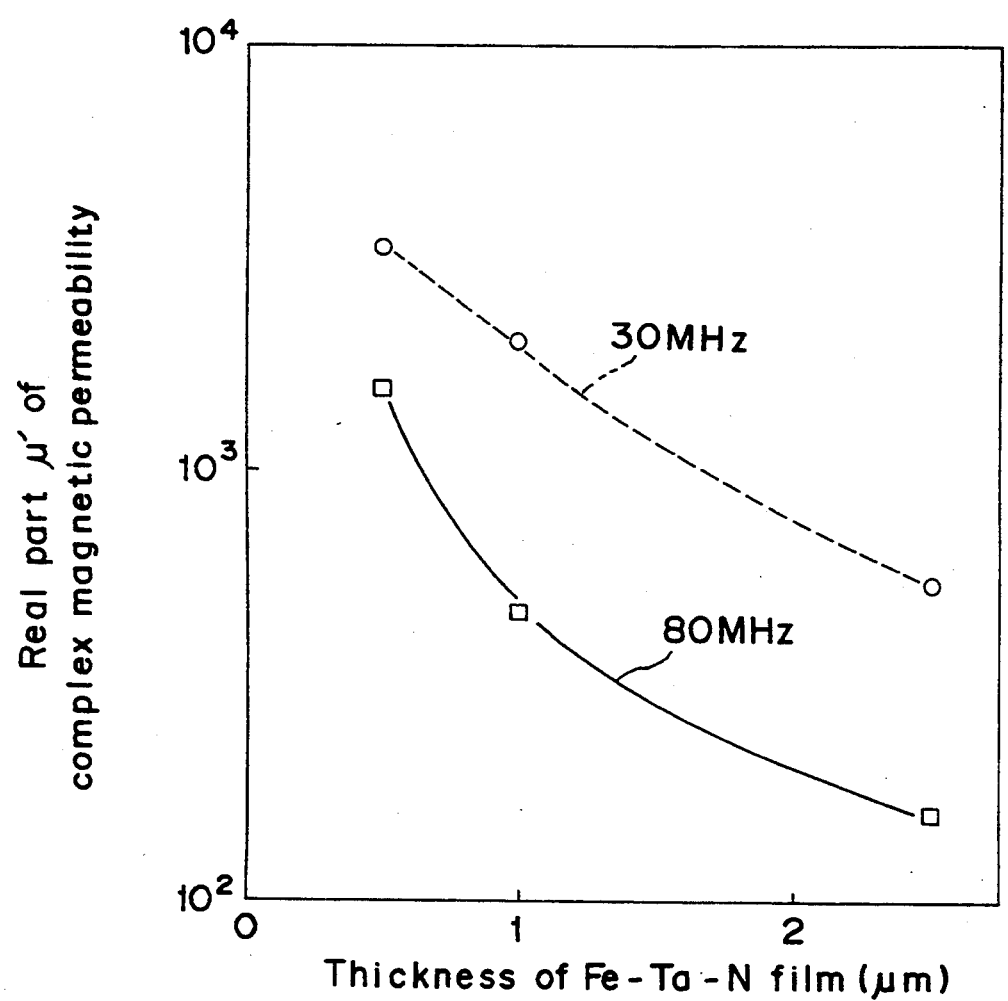
FIG. 13 is a graph showing the relation between the magnetic permeability and the thickness of the soft magnetic film of a multilayer type.
Figure 14:
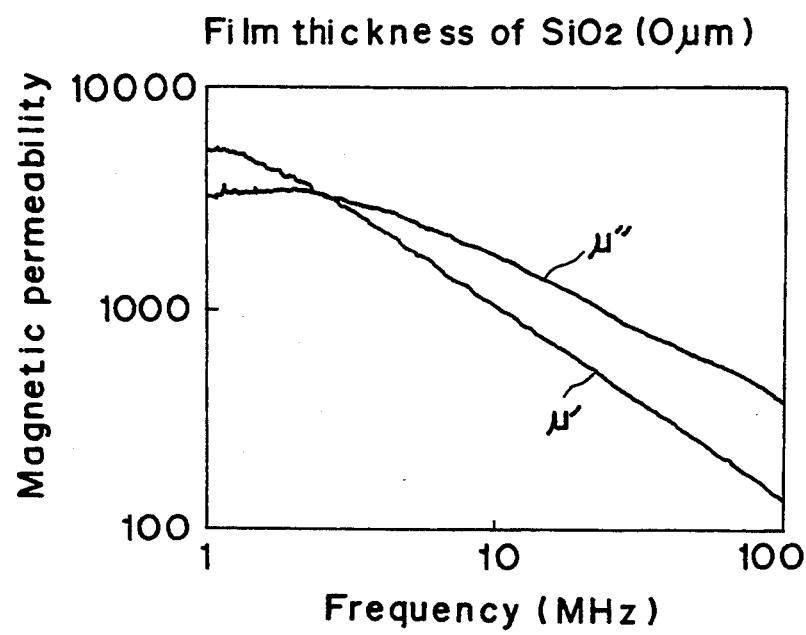
FIG. 14 is a graph showing the frequency dependence of the magnetic permeability of the soft magnetic film.
Figure 15:
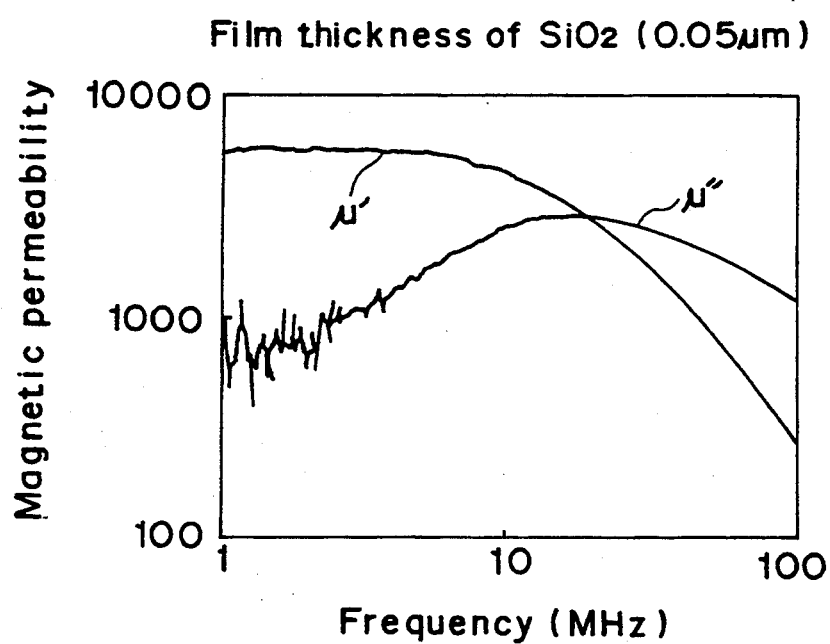
FIG. 15 is a graph showing the frequency dependence of the magnetic permeability of the soft magnetic film of multilayer type having a SiO$_2$ insulating film thickness of 0.05 μm.
Figure 16:
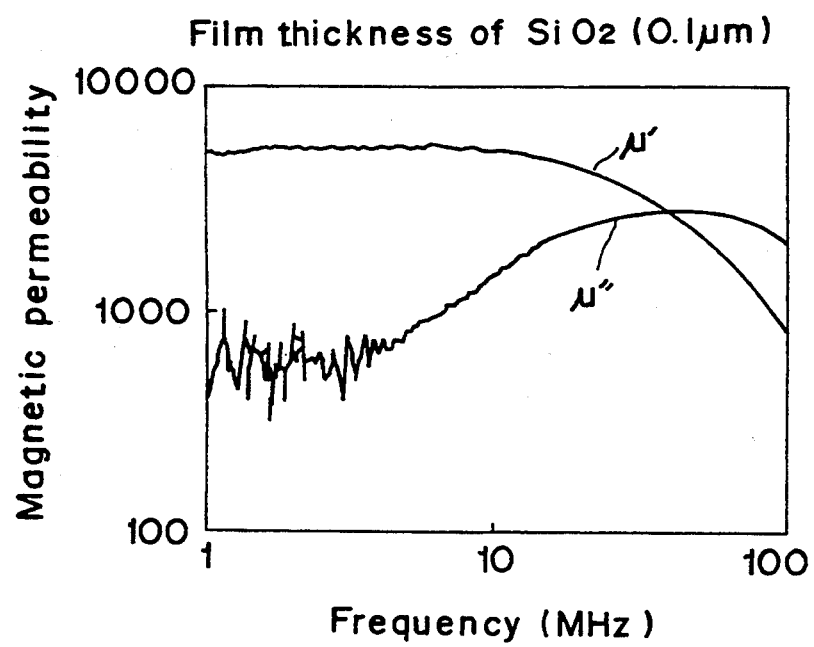
FIG. 16 is a graph showing the frequency dependence of the magnetic permeability of the soft magnetic film of multilayer type having a SiO$_2$ insulating film thickness of 0.1 μm.
Figure 17:
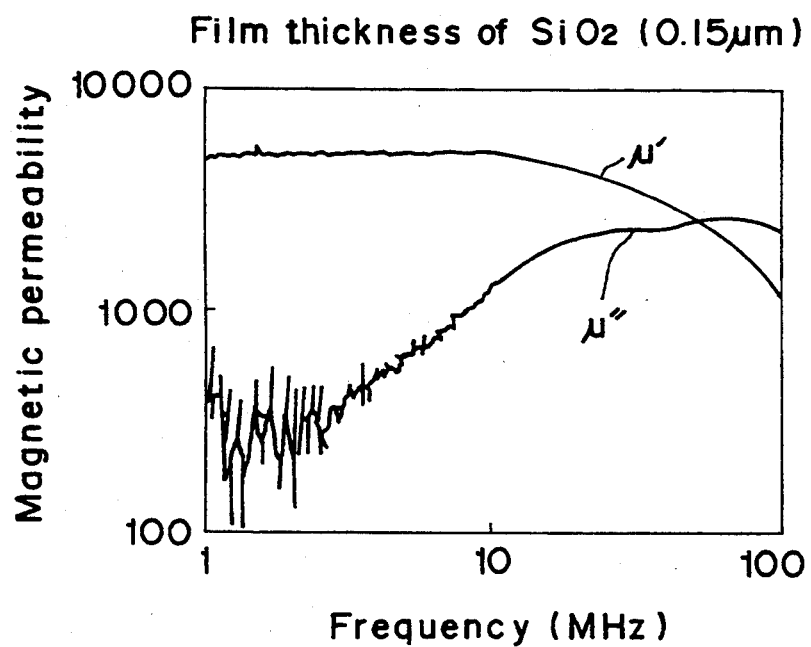
FIG. 17 is a graph showing the frequency dependence of the magnetic permeability of the soft magnetic film of multilayer type having a SiO$_2$ insulating film thickness of 0.15 μm.

Soft magnetic films of the Fe—Ta—N system are formed at bias powers of zero and 20 W and are alternately laminated to each other through a SiO$_2$ insulating film. The SiO$_2$ insulating film at each layer is of a thickness of 0.15 μm and the soft magnetic film is of a thickness ranging from 0.5 to 2.5 μm. The soft magnetic film of multilayer type has a total thickness of 5 μm. Each of the soft magnetic films of the various layers has a film composition and structure the same as those of example 1. These films show isotropic high magnetic permeability over the entire large area. FIG. 13 is a graph showing the relation between the thickness of the soft magnetic film of the Fe—Ta—N system at each of the layers and the real part $\mu'$ of the complex magnetic permeability at 30 MHz and 80 MHz. FIG. 13 clearly indicates that the soft magnetic film of the Fe—Ta—N system shows an increase in the real part $\mu'$ of the complex magnetic permeability at a high frequency (30 MHz and 80 MHz) with a decrease in the thickness of the film.

Soft magnetic films of the Fe—Ta—N system are formed at bias powers of zero and 20 W and are alternately laminated to each other through a SiO$_2$ insulating film. Each layer of the soft magnetic film of the Fe—Ta—N system is of a thickness of 0.5 μm. The SiO$_2$ insulating films at the various layers are changed in thickness so that the soft magnetic film of multilayer type has a total thickness of 5 μm.

The soft magnetic film of multilayer type has the SiO$_2$ insulating film interposed therebetween and shows isotropic high magnetic permeability over the entire large area of the substrate in a similar way to that of example 3. FIGS. 14, 15, 16, and 17 are graphs showing the variation in the real part $\mu'$ and the imaginary part $\mu''$ of the complex magnetic permeability of the soft magnetic films having the SiO$_2$ insulating films of respective thickness of 0, 0.05, 0.1, and 0.15 μm with variation in the frequency.

FIGS. 14, 15, 16, and 17 clearly show that an increase in the thickness of the $SiO_2$ insulating films results in an increase in the real part $\mu'$ of the complex magnetic permeability at a high frequency range. In addition, it is understood that the thicker film causes the frequency at which the imaginary part $\mu''$ of complex magnetic permeability shows a maximum, to shift to higher frequencies.

When the $SiO_2$ insulating film is of a thickness greater 0.3 $\mu$m, there is no frequency dependency of the real portion $\mu'$ and the imaginary part $\mu''$ of complex magnetic permeability. In the soft magnetic film of multilayer type, the adjacent Fe—Ta—N films separated through the $SiO_2$ insulating films are formed at different bias powers (including zero). In this case, it is possible to obtain isotropy of the high permeability at higher frequencies with thinner thicknesses of the soft magnetic film of the Fe—Ta—N system at each layer and with thicker thicknesses of the $SiO_2$ insulating film. The adjustment of the thickness of the soft magnetic film and the $SiO_2$ insulating film makes it possible to adjust the operable frequency of the soft magnetic film of a multilayer type. Accordingly, it is possible to manufacture the soft magnetic film of multilayer type suitable for a core material used in the laminated-type head over the entire large area and at a high production yield.

The description of this embodiment is directed to a soft magnetic film of the Fe—Ta—N system. However, it is possible to obtain the same effect as above by applying the method of this embodiment to formation of soft magnetic films of any other system such as a soft magnetic film including, as a main ingredient, Fe (iron), 5 to 20 atomic % of N (nitrogen), and 5 to 15 atomic % of M (a metal which is at least one element selected from the group consisting of Ta, Zr, Hf, Nb, and Ti) and a modified system further including additional additives such as Cr, Al, Si, or Ru for improving the corrosion resistance. A further superior soft magnetic characteristic can be obtained by using the following film composition: a soft magnetic film including, as a main ingredient, Fe (iron), 5 to 20 atomic % of N (nitrogen), and 5 to 15 atomic % of M (metal which is at least one element selected from the group consisting of Ta, Zr, Hf, Nb, and Ti), wherein said soft magnetic film comprises a mixture of 1) fine crystals of $\alpha$—Fe which include as a solid solution at least one element selected from the group consisting of Ta, Zr, Hf, Nb, and Ti, N (nitrogen), and metal (M) nitride and which have an average grain size less than 15 nm and 2) fine particles of metal nitride having a grain size less than 5 nm.

This example is directed to the multilayer type of soft magnetic film obtained by alternately laminating to each other soft magnetic films of the Fe—Ta—N system formed at non-bias and at RF bias power of 20 W to each other through a $SiO_2$ insulating film. The applied bias voltage may be DC bias voltage. It is also found that the same effect as above can be obtained with the multilayer type of soft magnetic film in which the two soft magnetic films of Fe—Ta—N system adjacent to each other through a $SiO_2$ insulating film are applied with different bias powers (including zero).

As another example of the modification, a change in the magnetic field distribution as shown in FIG. 2 on the surface of the target results in a change in the plasma state and in a variation in the anisotropy of the magnetic permeability of the film plane with a variation in the substrate position. In this case, it is possible to achieve an effect the same as that described in this embodiment.

It is to be noted that the method for making the soft magnetic film described in this embodiment is applicable to other systems including, as a main ingredient, Fe or Co such as Sendust (Fe—Ai—Si alloy system), Fe—M—(C,B), or Co—M—(N,C) systems; wherein M is an element selected from the group consisting of Zr, Hf, Ti, Nb, and Ta.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for making a soft magnetic film comprised of a ferromagnetic metal component on a substrate by sputtering from a rectangular flat plate target by means of a magnetron sputtering apparatus, which comprises a step of forming lines of magnetic force applied in parallel to a surface of the rectangular flat plate target and arranged symmetrically on opposite sides of a center line of the target into right side lines and left side lines, the right side lines having a direction reverse to that of the left side lines, magnetic strength distributions on both sides of the center line being symmetrical.

2. The method for making a soft magnetic film according to claim 1, wherein the soft magnetic film comprises as a main ingredient, Co or Fe.

3. The method for making a soft magnetic film according to claim 1, wherein the soft magnetic film comprises Fe, 5 to 20 atomic % of N, and 5 to 15 atomic % of a metal, M, which is at least one element selected from the group consisting of Ta, Zr, Hf, Nb, and Ti.

4. The method for making a soft magnetic film according to claim 1, wherein the soft magnetic film comprises Fe, 5 to 20 atomic % of N, and 5 to 15 atomic % of Ta.

5. The method for making a soft magnetic film according to claims 1, 2, 3 or 4, wherein a bias power is continuously applied to the substrate to be provided with the soft magnetic film during the sputtering step.

6. The method for making a soft magnetic film according to claim 5, wherein the applied bias power density is set to 3700 $W/m^2$ or less.

7. A method for making a multilayer soft magnetic film comprising soft magnetic films and an insulating film which are alternately laminated according to claims 1, 2 or 3, wherein at least two soft magnetic films, laminated to each other through the insulating film, are formed on said substrate by means of the sputtering with a bias condition set to a different power, including a non-bias condition, for each film to provide a relatively large isotropic area of the resulting soft magnetic film.

8. A magnetic head in which at least a part of a magnetic circuit comprises the multilayer soft magnetic film formed by the method according to claim 7.

9. A method for making a soft magnetic film comprised of Fe, 5 to 20 atomic % of N, and 5 to 15 atomic % of a metal, M, which is at least one element selected from the group consisting of Ta, Zr, Hf, Nb, and Ti according to claims 2, 3 or 4, wherein said soft magnetic film comprises a mixture of fine crystals of $\alpha$—Fe and fine particles of a nitride of a metal, M, in which the $\alpha$—Fe crystals includes as a solid solution at least one element or compound selected from the group consisting of Ta, Zr, Hf, Nb, and Ti, N, and a metal nitride, which expand the lattices of α—Fe, the fine crystals of α—Fe having an average grain size of 15 nm or less and the fine crystals of metal nitride having an average grain size of 5 nm or less.

10. A magnetic head in which at least a part of a magnetic circuit comprises the soft magnetic film formed by the method according to claims 1, 2, 3 or 4.

11. A rectangular flat plate sputtering target electrode for making a soft magnetic film comprised of a ferromagnetic metal component on a substrate, which comprises a magnet means for forming lines of magnetic force applied in parallel to a surface of the target and arranged symmetrically on opposite sides of a center line of the target into right side lines and left side lines, the right side lines having a direction reverse to that of the left side lines, magnetic strength distributions on both sides of the center line being symmetrical.

* * * * *